United States Patent

Blount

[15] 3,686,866

[45] Aug. 29, 1972

[54] BLEEDING SEAL
[72] Inventor: Walter H. Blount, Owosso, Mich.
[73] Assignee: Midland-Ross Corporation, Cleveland, Ohio
[22] Filed: Dec. 11, 1967
[21] Appl. No.: 689,607

[52] U.S. Cl. ............................... 60/54.6 R, 277/212
[51] Int. Cl. .............................................. F15b 7/00
[58] Field of Search ............. 277/212 C; 188/152.14; 60/54.6; 74/18.2

[56] References Cited

UNITED STATES PATENTS 3,426,531  2/1969  Reznicek et al. ........... 60/54.6

Primary Examiner—Martin P. Schwadron
Assistant Examiner—A. M. Zupcic
Attorney—Malcolm R. McKinnon

[57] ABSTRACT

A master cylinder assembly for use in a split hydraulic brake system of a motor vehicle for substantially simultaneously actuating separate sets of front and rear wheel brakes. The assembly includes a housing defining a cylindrical bore closed at one end and having a first piston slidable in the other end, a floating piston disposed between the first piston and the one end, coiled compression springs disposed on the opposite sides of the floating piston for returning both pistons to inoperative positions, and a fluid reservoir for supplying hydraulic fluid to the chambers located on opposite sides of the floating piston, which chambers are adapted to be in communication respectively with the front and rear sets of brakes. The first piston has a cavity in its outer end into which a push rod extends for operating the pistons, and the first piston has a resilient lip seal around its outer periphery to effect a fluid-tight seal with the bore when the piston is moved to an operative position by operation of the push rod. A bleeding seal is mounted in the housing and has a lip portion overlying the outer end of the first piston when the latter is in its inoperative position so that during conventional bleeding operations of the master cylinder, if said resilient lip seal should collapse allowing inflow of ambient air, the lip portion of the bleeding seal will be responsive to a pressure drop on its inner surface to seat on the outer end of the first piston to provide a seal against such inflow of ambient air.

11 Claims, 2 Drawing Figures

INVENTOR
WALTER H. BLOUNT

BY
Olsen and Stephenson
ATTORNEYS

BLEEDING SEAL

BACKGROUND OF THE INVENTION

It is conventional practice in using hydraulic power brake systems to provide closed hydraulic circuits between the master cylinder and the wheel brakes. In order to avoid malfunction of these brake systems, it is necessary that air be eliminated from the systems, and this is most effectively accomplished by performing a bleeding operation at the time of initially charging the system with the hydraulic fluid and at other occasions, if and when servicing of the systems is required.

The bleeding operation normally employed is carried out by initially evacuating the system before allowing the hydraulic fluid to enter into the system, and then to allow flow of the fluid through the evacuated system.

One of the problems that often arises when evacuating a system is that the seal that exists between the power piston and the bore of the master cylinder sometimes collapses during the evacuation operation, resulting in ambient air leaking into the master cylinder around the collapsed seal, thereby preventing effective removal of air from the system.

The present invention provides a solution for this problem, and according to one form of the present invention a master cylinder assembly for a vehicle brake system is provided which includes a main housing defining therein a cylindrical bore open at one end, a piston reciprocable in said bore and having a recess in one end opening in the direction of said one end of the housing, a push rod extending into said recessed bore for operating the piston, and an annular seal mounted between the side wall of said piston and the inner wall of said bore, wherein the improvement comprises a flexible resilient seal member mounted in sealing relationship to the one end of said main housing, said seal member having an annular radially directed lip portion surrounding said push rod adjacent to said recess and deflectable into sealing relationship with said one end of the piston in response to a pressure differential on axially opposite faces of the lip portion, whereby when said master cylinder assembly is subjected to a vacuum for bleeding purposes, said seal member will provide a seal between the piston and bore if said annular seal collapses, permitting leakage of air into said assembly. The flexible resilient seal member can be used with any form of master cylinder assembly, irrespective of whether the master cylinder is adapted for use with a single brake system or a dual brake system. Also, the flexible resilient seal member can be an independent element mounted on the housing of the master cylinder, or it can be formed as a part of a collapsible boot seal that is mounted on the housing of the master cylinder and extends into engagement with the push rod for operating the master cylinder.

Accordingly, it is an object of the present invention to provide an improved master cylinder assembly which has an effective bleeding seal operatively disposed between the power piston and the housing of the master cylinder.

It is another object of the present invention to provide a bleeding seal adapted to be operatively disposed between the power piston and the housing of a master cylinder.

Other objects of this invention will appear in the following description and appended claims, reference being had to the accompanying drawing forming a part of this specification wherein like reference characters designate corresponding parts in the several views.

DESCRIPTION OF THE PREFERRED EMBODIMENTS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
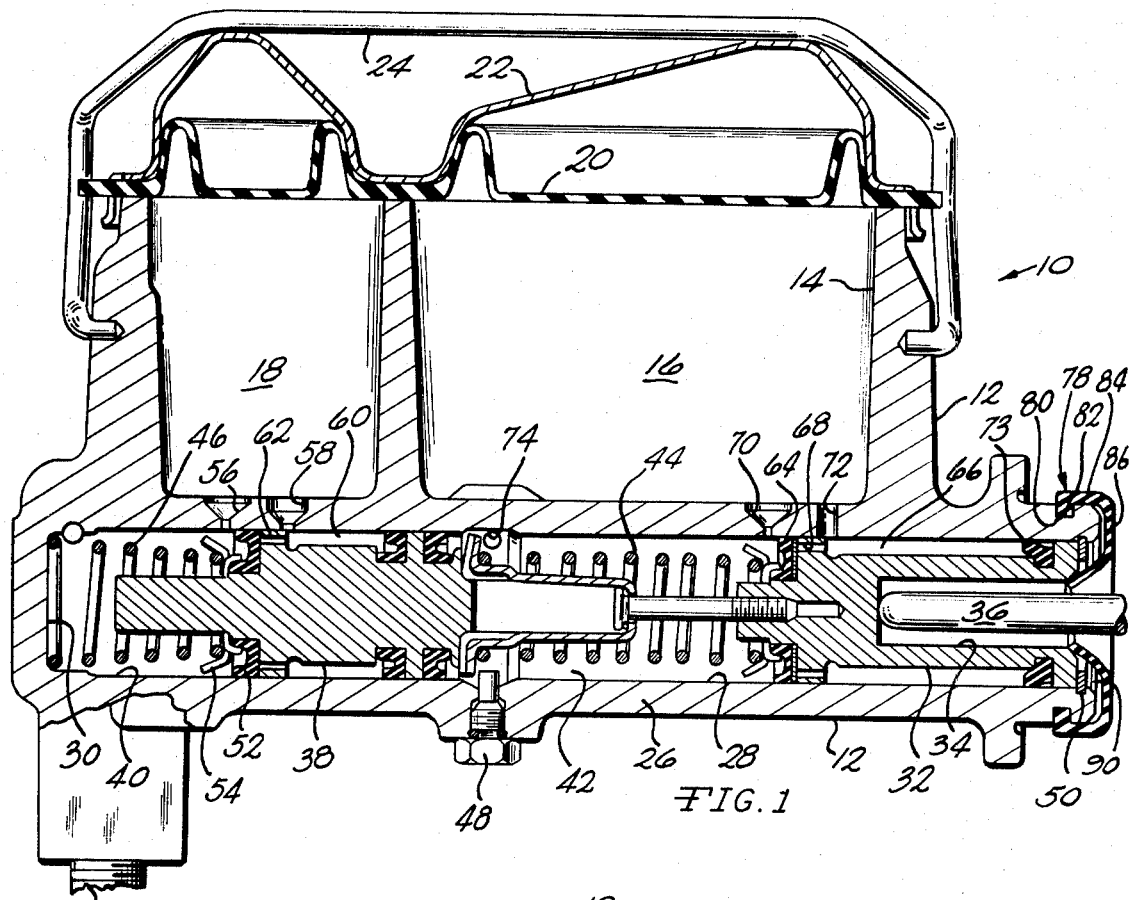
FIG. 1 is a longitudinal section of a master cylinder embodying one form of the present invention.

Referring now to FIG. 1, the master cylinder 10 will be described briefly, the latter being a tendem master cylinder adapted for use with a split brake system, but it is to be understood that the improvement comprising the present invention may be used with other forms of master cylinders and the improvement is described in connection with the tandem master cylinder for the purpose of providing a suitable environment for describing the invention.

The master cylinder 10 includes a main housing 12 which defines in its upper portion a brake fluid reservoir 14 comprising a first sump chamber 16 and a second sump chamber 18. A suitable cover arrangement is provided for the reservoir 14 comprising a seal member 20, a removable cap member 22, and a cap retainer member 24.

The main housing 12 defines in its lower portion a cylinder barrel 26 having a cylindrical bore 28 closed at one end 30, and open at the other end. A first piston 32 is positioned in the other end of the bore 28 and has a cavity 34 therein into which a push rod 36 projects for pushing the piston 32 from its inoperative position, shown in FIG. 1, inwardly into the bore 28 to an operative position.

A second or floating piston 38 is positioned in the bore 28 between the piston 32 and the closed end 30, so as to define two work chambers 40 and 42 on opposite ends of the piston 38. Mounted on the one end of the piston 32 and extending through the chamber 42 is the caged compression spring 44, and mounted on the chamber 40 is the compression coil spring 46. The compression springs 44 and 46 function in a manner well known in the art to urge the pistons 32 and 38 to their inoperative positions shown in FIG. 1 against the limit stops 48 and 50. The piston face seal 52 and the associated spring retainer 54 for permitting the compression spring 46 to be seated on the face seal 52 are conventional in the art, as is the arrangement of the compensating port 56 which provides communication between the sump chamber 18 and the high pressure chamber 40 and the replenishing port 58 which provides communication between the sump chamber 18 and the low pressure chamber 60 surrounding the piston 38. In a conventional manner, the face seal 52 prevents passage of fluid from the chamber 40 to the chamber 60, but permits passage of liquid from chamber 60 to chamber 40 via a series of apertures 62 during retracting movement of the floating piston toward its inoperative position.

The piston 32 also has a conventional face seal 64 mounted on its inner end to prevent passage of fluid from the high pressure chamber 42 to the low pressure chamber 66 surrounding the piston 32, and such face seal 64 is collapsible during retracting movement of the piston 32 toward its inoperative position to permit flow of fluid from chamber 66 into chamber 42 via the holes 68. A compensating port 70 provides communication between the sump chamber 16 and the high pressure chamber 42, and a replenishing port 72 provides communication between the sump chamber 16 and the low pressure chamber 66. A conventional resilient lip seal 73 is seated in the outer end of first piston 32 to provide an effective seal between piston 32 and bore 28.

The high pressure chamber 42 has an outlet port 74 which communicates with the rear brake system, and the high pressure chamber 40 has an outlet which communicates via conduit 76 with the forward brake system of the vehicle.

The structure defined above with respect to the master cylinder 10 is known in the art, and the defined elements function in the conventional manner so that a detailed description of their operation is not deemed necessary. Attention is now directed to FIG. 1, and particularly to the flexible resilient seal member 78 and its arrangement relative to the bore 28, which comprises the improvement embodying the present invention. As shown, the flexible resilient seal member 78 comprises a base portion 80 which is seated in an annular groove 82 extending around the wall of the cylinder barrel 26. A sleeve portion 84 extends axially from the base portion 80 beyond the one end of bore 28 and then turns radially inwardly to define an annular radially directed lip portion 86. The latter, adjacent to its radially inner terminus, converges inwardly toward the cavity 34 located in piston 32. The annular radially inwardly directed lip portion 86 terminates short of the push rod 36 so that during the normal movements of the push rod 36, the lip portion 86 will be inoperative and will not be moved by the rod 36. The lip portion 86 is of a flexible nature so that if a pressure drop occurs on the inner side of the lip portion, the pressure differential on opposite faces of the lip portion will cause the terminal portion of the lip portion to seat against the end of the piston 32, and thereby to provide a seal which will prevent leakage of ambient air around the periphery of piston 32 between the latter and the bore 28. From this description, it is to be understood that the flexible resilient seal member is operative only during bleeding operation of the master cylinder 10, and it performs no functions during the normal operation of the master cylinder 10 in a conventional braking system.

In the normal bleeding operation which occurs with the parts located in the positions illustrated in FIG. 1, a vacuum connection is normally made at the compensating port 70, and the replenishing port 72 is closed. During this step of operation, the face seal 64 will collapse resulting in air being evacuated from the low pressure chamber 66, and at this time it is desired that the resilient lip seal 73 maintain an effective seal between the piston 32 and the bore 28. However, this does not always occur, because the seal 73 sometimes also collapses, and the evacuating operation then becomes ineffective because air is being drawn from the surrounding environment past the seal 73 into the chamber 66. Prior to the present invention, this unfavorable result made it difficult to perform a satisfactory bleeding operation before initially charging a brake system with hydraulic fluid or recharging a system. However, when the flexible resilient seal member 78 is mounted on the end of the housing 12, in the manner shown, if the seal 73 collapses during the bleeding operation, the pressure differential created by air being drawn from the space 90, will produce a pressure differential on opposite faces of the seal member 78 which will have the effect of collapsing the lip portion 86 against piston 32, producing a seal between inner periphery of the recess 34 of the piston 32 and the inner face of the seal member 78. Thus, the bleeding operation can be performed without ambient air being drawn into the chamber 66.

Figure 2:
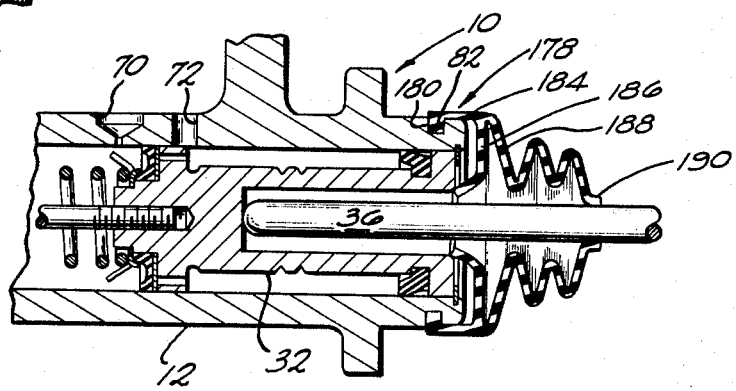
FIG. 2 is a fragmentary section showing a second embodiment of the present invention.

Referring now to FIG. 2, a modified form of the invention will be described. In this embodiment, a master cylinder 10, essentially the same as that shown in FIG. 1 is employed, and like reference numbers indicate corresponding parts to those described with respect to the embodiment of FIG. 1. In this embodiment of the invention a modified form of a flexible resilient seal member 178 is provided. A base portion 180 is seated in the annular groove 82, and extending from the base portion 180 is a sleeve portion 184. Directed radially inwardly from the sleeve 184 is the annular radially inwardly directed lip portion 186 which adjacent to its inner end is directed axially inwardly toward the one end of the piston 32, and this lip portion 186 functions essentially the same as the lip portion 86 described with respect to the embodiment of FIG. 1. The present embodiment also includes as an extension of the portion 184 a collapsible boot 188 which terminates in an annulus 190 which is seated on the push rod 36. The collapsible boot 190 is fitted to prevent the ingress of dirt and moisture to the working parts of the master cylinder, and the annulus 190 is seated on the push rod 36 for reciprocable movement together with the push rod 36.

Having thus described my invention, I claim:

1. In a master cylinder assembly for a vehicle brake system which includes a main housing defining therein a cylindrical bore open at one end of the housing, a piston reciprocable in said bore and having a recess in one end opening in the direction of said one end of the housing, a push rod extending into said recess for operating said piston, and an annular seal mounted between the side wall of said piston and the inner wall of said bore, wherein the improvement comprises a flexible resilient seal member mounted in sealing relationship to the one end of said main housing, said seal member having an annular radially inwardly directed lip portion surrounding said push rod adjacent to said recess and deflectable into sealing relationship with said one end of the piston in response to a pressure differential on axially opposite faces of the lip portion, whereby when said master cylinder assembly is subjected to a vacuum for bleeding purposes, said seal member will provide a seal between the piston and bore if said annular seal permits leakage of air into said assembly.

2. In a master cylinder assembly according to claim 1, wherein said main housing has a cylindrical portion terminating in said one end of the housing, said cylindrical portion having a circumferential groove adjacent to said one end of the housing, and said seal member has an annular base portion seated in said groove and a sleeve portion projecting beyond said end of the housing, said radially inwardly directed lip portion being an extension of said sleeve portion.

3. In a master cylinder assembly according to claim 2, wherein the inner terminus of said lip portion is spaced from said push rod so that said seal member is unaffected by normal movement of said push rod.

4. In a master cylinder assembly according to claim 2, wherein said lip portion near its radially inner terminus is inclined toward said recess so that when said lip portion is deflected against said one end of the piston the lip portion will sealingly engage the inner periphery of said recess.

5. In a master cylinder assembly according to claim 2, wherein said seal member includes a collapsible boot portion also forming an extension of said sleeve and enclosing said lip portion, said boot portion having a terminal annulus seated on said push rod.

6. A flexible resilient bleeding seal adapted for use with a power cylinder to restrict flow of air into the cylinder between the bore thereof and the piston during bleeding operations, comprising an annular base portion for seating in sealed relation on the cylinder, and an annular lip portion connected to said base portion and extending radially inwardly, said lip portion having resilient properties for axial deflection in response to atmospheric pressure differentials on opposite faces of the lip portion so that if leakage occurs between said piston and bore during bleeding operations, said lip portion will deflect into sealing engagement with said piston.

7. A flexible resilient bleeding seal according to claim 6, wherein said lip portion is connected to said base portion by an impervious sleeve.

8. A flexible resilient bleeding seal according to claim 7, wherein said lip portion has a reverse inclined terminus.

9. A flexible resilient bleeding seal according to claim 8, wherein said sleeve is also connected to a collapsible boot extending axially beyond said lip portion.

10. A master cylinder comprising:
a housing having an open ended bore therein with an inlet port from a reservoir cavity to the bore and an outlet port therefrom;
piston means operatively arranged to be actuatable to close said inlet port and thereafter pressurize fluid for delivery through said outlet port; and
a sealing boot affixed to said housing adjacent said open end, said boot having an inwardly projecting portion extending around the end of said housing into said bore area and abutting a rear face of said piston means in its rearward, rest position in said bore.

11. The structure of claim 10 wherein said inwardly projecting portion extends into said bore at an angle to the bore and terminates as an annular body within the bore.

* * * * *